(12) United States Patent
Ye

(10) Patent No.: US 8,376,545 B2
(45) Date of Patent: Feb. 19, 2013

(54) GLASSES FOR PREVENTING SLEEPINESS TO WEARER

(76) Inventor: Kyung Bok Ye, Seoul (KR)

( * ) Notice: Subject to any disclaimer, the term of this patent is extended or adjusted under 35 U.S.C. 154(b) by 0 days.

(21) Appl. No.: 13/155,478

(22) Filed: Jun. 8, 2011

(65) Prior Publication Data

US 2011/0234973 A1 Sep. 29, 2011

Related U.S. Application Data

(63) Continuation of application No. PCT/KR2009/007184, filed on Dec. 3, 2009.

(30) Foreign Application Priority Data

Dec. 8, 2008 (KR) .................. 10-2008-0124104

(51) Int. Cl.
G02C 11/00 (2006.01)
(52) U.S. Cl. ............................................. 351/158
(58) Field of Classification Search .......... 351/111–123, 351/158
See application file for complete search history.

(56) References Cited

U.S. PATENT DOCUMENTS

2010/0309426 A1* 12/2010 Howell et al. ................. 351/158

FOREIGN PATENT DOCUMENTS

| CN | 200972552 Y | * | 11/2007 |
|---|---|---|---|
| JP | 2008-102466 A | | 5/2008 |
| KR | 20-1990-0000311 | | 1/1990 |
| KR | 10-1997-0048696 | | 7/1997 |
| KR | 10-1998-0083701 A | | 12/1998 |
| KR | 20-0338245 Y1 | | 9/2003 |
| KR | 10-2005-0006979 A | | 1/2005 |

OTHER PUBLICATIONS

International Search Report (PCT/KR2009/007184).

* cited by examiner

*Primary Examiner* — Darryl J Collins
(74) *Attorney, Agent, or Firm* — Park & Associates IP Law, P.C.

(57) ABSTRACT

The glasses 100 for preventing sleepiness according to the present invention comprises a pair of temple arms 102 provided on the both sides of the glasses frame 101 for mounting the glasses frame 101 on the face of the user; the stimulating body 112 provided on the pair of temple arms for stimulating the area of the temple of the user; the vibration element 104 for giving the vibration to the stimulating body 112; the battery 116 for supplying electric power to the vibration element 104; and the plurality of operating buttons 108 for selectively electrically connecting the vibration element 104 to the battery 106.

5 Claims, 3 Drawing Sheets

GLASSES FOR PREVENTING SLEEPINESS TO WEARER

REFERENCE TO RELATED APPLICATIONS

This application is a continuation of PCT international application Ser. No. PCT/KR2009/007184 filed Dec. 3, 2009 which designates the United States and claims the priority of the filing date of KR application serial number 10-2008-0124104, filed Dec. 8, 2008, the entire contents of which are incorporated herein by reference.

FIELD OF THE INVENTION

The present invention relates to glasses for preventing sleepiness, and more particularly, to glasses for preventing sleepiness enabling to prevent user's sleepiness by stimulating the area of the temple of the user.

BACKGROUND OF THE INVENTION

Sleepiness is a rising issue when a person is tired, and it typically occurs when a person works for a long period of time and that easily raises dangerous situation.

For example, long time driving, more specifically night time driving alone, can easily make one sleepy, but there is no way to prevent the sleepiness except for short rest or sleep. However, most vehicle drivers usually drive without enough rest or sleep because of their intensive work, and therefore the frequency of vehicle accidents has not decreased.

SUMMARY OF THE INVENTION

The present invention is created to solve a problem of the above-mentioned prior art, and accordingly the object of the present invention provides glasses for preventing sleepiness enabling to prevent users from becoming sleepy by stimulating the area of the temple of the user without the cease of the work within a short time.

In order to achieve the above-described object, the present invention provides glasses for preventing sleepiness comprising a pair of temple arms for mounting a glasses frame on the face of the user, the temple arms provided on the both sides of a glasses frame; a stimulating body for stimulating the area of the temple of the user, the stimulating body provided on the pair of temples and; a vibration element for providing vibration to the stimulating body; a battery for supplying electric power to the vibration element; and a plurality of operating buttons for selectively electrically connecting the vibration element to the battery, the operating buttons having various of vibration modes inclusive of vibration mode, sound mode and rubbing mode and on/off function, wherein the pair of temples are formed with a vibration element receiving recess in which the vibration element is received, a battery receiving recess in which the battery is received and a cover recess in which a cover for protecting the vibration element and the battery from outside is inserted.

In the glasses for preventing sleepiness, the stimulating body may have a hemisphere shape and made of elastic materials like rubber.

In the glasses for preventing sleepiness, the stimulating body may be composed of a hemispherical or partially spherical shaped stimulating portion, a disc shape installing portion and a disc shape extending portion, and wherein the disc shape installing portion may be inserted in the through-hole formed in the cover with a predetermined space, the disc shape extending portion is extended toward the disc shape installing portion and has a larger diameter than that of the through-hole such that it is not easily detached through the through-hole.

In the glasses for preventing sleepiness, the hemispherical or partially spherical shaped stimulating portion may be outwardly exposed and formed with a plurality of protrusions on the surface thereof in order to enhance the stimulation strength of the area of the temple.

In the glasses for preventing sleepiness, the battery may be rechargeable or non-rechargeable.

In the glasses for preventing sleepiness, the vibration element may generate sound.

According to the present invention, glasses for preventing sleepiness can prevent user's sleepiness without the cease of the work because the area of the temple of the user is stimulated.

Further, the glasses can more effectively prevent user's sleepiness in short time due to sound effects in addition to the stimulation of the area of the temple.

BRIEF DESCRIPTION OF THE DRAWINGS

The above and other objects and advantages of the present invention will become readily apparent by reference to the following detailed description when considered in conjunction with the accompanying drawing wherein.

DETAILED DESCRIPTION OF THE INVENTION

Hereinafter, glasses for preventing sleepiness according to preferred embodiment of the present invention will be described in detail with reference to the accompanying drawings.

Figure 1:
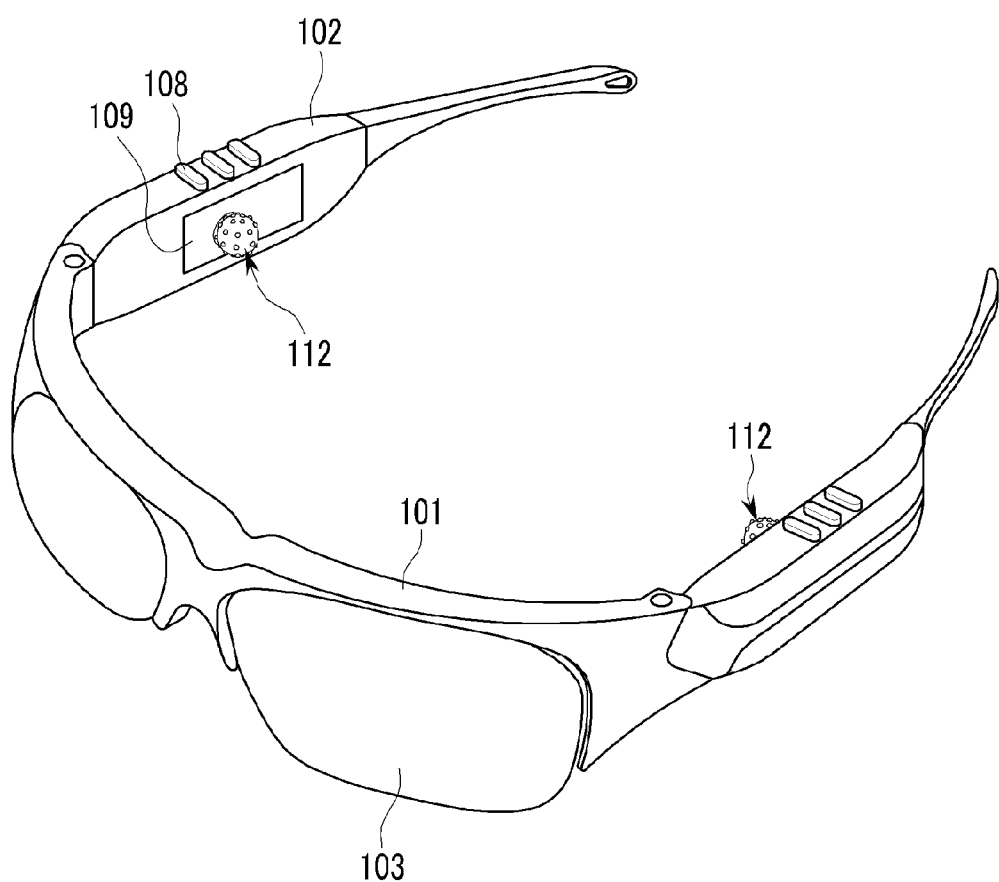
FIG. 1 is a perspective view schematically illustrating glasses for prevention of sleepiness according to a preferred embodiment of the present invention.
Figure 2:
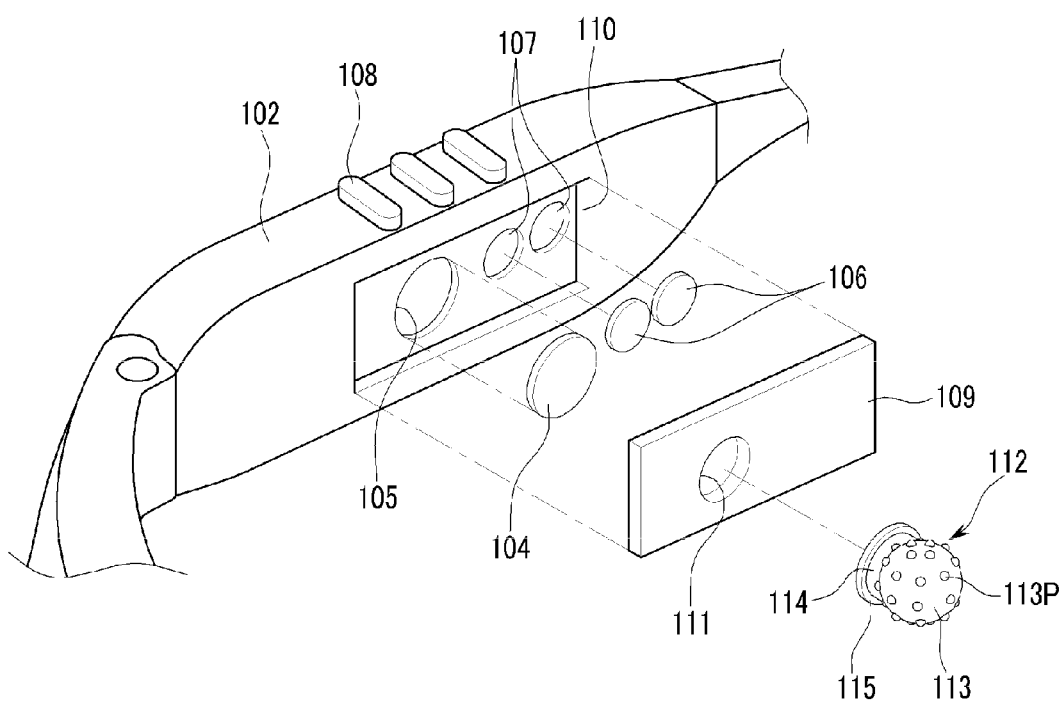
FIG. 2 is a broken view schematically illustrating essential parts including vibration element of FIG. 1.

As shown in FIGS. 1 and 2, the glasses for preventing sleepiness 100 comprise glasses frame 101 and a pair of temple arms 102.

The glasses frame 101 is for holding spectacle lens 103, and the spectacle lens 103 is detachably mounted on the glasses frame 101. The spectacle lens 103 may be transparent or may be obscure like sunglass lens. And, the spectacle lens 103 may be selected to have a color according to the preference of its user.

The pair of temple arms 102 is for mounting the glasses frame 101 on the face of the user, and it is provided on the both sides of the glasses frame 101 such that it may be fully fold inwardly toward the glasses frame 101.

The pair of temple arms 102 is equipped with a vibration element 104 for generating the vibration which stimulates the area of the temple on the middle portion thereof, preferably on the portion which is near the temple of the user's face.

The vibration element 104 is inserted in a vibration element receiving recess 105 formed in the pair of temple arms temples 102, and a battery 106 for supplying electrical power to the vibration element 104 is inserted in a battery receiving recess 107 formed near the vibration element receiving recess 105. The vibration element 104 is electrically connected to plurality of operating buttons 108 provided on the upper side of the pair of temple arms 102 such that the vibration element 104 is operated by the plurality of operating buttons 108. Vibration mode and/or sound mode may be set, or various vibration types like rubbing may be select, or on and off may be set by the operation of the plurality of operating buttons 108.

In the present embodiment, the battery 106 is designed to be replaced by being inserted in the battery receiving recess 107. However, alternatively any rechargeable battery may be applied in order to enhance the convenience of its usage. In this case, the user can recharge the rechargeable battery using exterior charging jack at any time without the replacement of the battery.

The vibration element 104 is protected from external environment by a detachable cover 109 covered on the pair of temple arms 102. The cover 109 is tightly inserted in a cover recess 110 corresponding thereto formed in the pair of temple arms 102, and the cover 109 is formed with a through-hole 111 near middle thereof.

A stimulating body 112 having a hemisphere or spherical shape which stimulates the area of the temple of the user is made of elastic materials like rubber, and it is composed of a hemispherical or partially spherical shaped stimulating portion 113, a disc shaped installing portion 114 and a disc shaped extending portion 115.

The stimulating portion 113 is exposed out of the cover 109, and it is formed with a plurality of protrusions 113p on the surface thereof in order to enhance the stimulation strength of the area of the temple. The installing portion 114 is integrally connected to the stimulating portion 113, and it is inserted in the through-hole 111 formed in the cover 109 with a predetermined space. The extending portion 115 is extended toward the outside of the installing portion 114, and it has larger diameter than that of the through-hole 111 such that it is not easily detached through the through-hole 111.

Therefore, the stimulating body 112 may be moved with a constant distance in its thickness direction with respect to the cover 109, and therefore the vibration given by the vibration element 104 is much well transferred toward the temple, and the area of the temple is more effectively stimulated.

In this embodiment, the vibration element 104 is designed to be protected from outside by the cover 109. However, alternatively it may be designed to be fully buried in the pair of temple arms 102. In this case, the stimulating body 112 is not inserted in the cover 109 but inserted in the through-hole which would be formed other portion of the temple arms 102.

Figure 3:
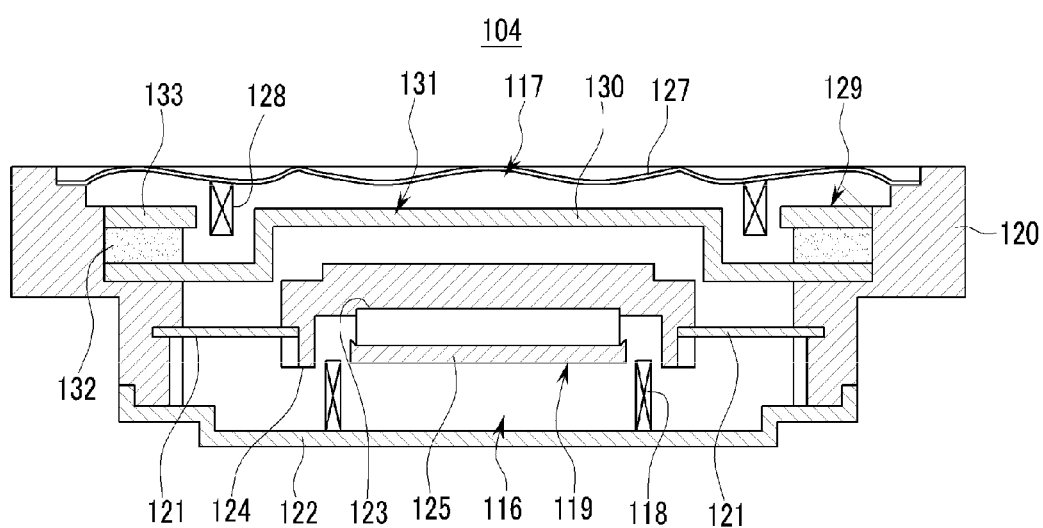
FIG. 3 is a cross-sectional view schematically illustrating the structure of the vibration element of FIG. 2.

Next, the specific structure of the vibration element will be explained with reference to FIG. 3. The vibration element 104 of this embodiment is designed that a vibration generating means 116 and a sound generating means 117 may be fully separated. However, the vibration generating means 116 and the sound generating means 117 may not be separated.

The vibration generating means 116 is composed of a cylindrical shaped magnetized coil 118, a first magnetic generating means 119 corresponding to the magnetized coil 118, and an annular disc spring 121 integrally interposed between the outer peripheral surface of the first magnetic generating means 119 and the inner peripheral surface of the cylindrical case 120.

The magnetized coil 118 is not vibrated when it is magnetized by the predetermined given electrical signals since it is fixed on the bottom plate 122 integrally connected to the lower end of the case 120, but the first magnetic generating means 119 connected to the annular disc spring 121 is vibrated upwardly and downwardly.

The first magnetic generating means 119 is composed of a yoke 124 which is upwardly apart from the magnetized coil 118 with a predetermined distance, is formed with a circular recess portion 123 in the center portion thereof, and has a downward fell down cup shape by having a downward protruded outer peripheral surface, a magnet 125 which is orderly attached in the circular recess portion 123 of the yoke 124, and a poll piece 126. And, the first magnetic generating means 119 is connected so that the magnetized coil 118 is put between the protrusion of the yoke 124 and the magnet 125.

The sound generating means 117 is composed of a cylindrical voice coil 128 which is put over the vibration generating means 116 and fixed under a vibration plate 127, and a second magnetic generating means 129 corresponding to the cylindrical voice coil 128. And, the second magnetic generating means 129 a yoke 131 which is downwardly apart from the voice coil 128 with a predetermined distance, is formed with a circular protrusion 130 in the center portion thereof to have a felt hat shape, and is integrally fixed to the case 120, an annular magnet 132 closely attached on the inner peripheral surface of the cylindrical case 120, and a poll piece 133. The yoke 124 of the first magnetic generating means 119 is installed to be inserted in the space formed under the circular protrusion 130 of the yoke 131, and therefore the contact between the first magnetic generating means 119 and the upper yoke 131 is decreased when the first magnetic generating means 119 is vibrated upwardly and downwardly, which can minimize the height of the sound and vibration generating elements according to the present invention.

At this time, the cylindrical voice coil 128 is fixed to the vibration plate 127 which may be upwardly and downwardly vibrated, and the second magnetic generating means 129 is integrally connected to the case 120, and therefore, the second magnetic generating means 129 is not vibrated but the voice coil 128 fixed on the vibration plate 127 is upwardly and downwardly vibrated together with the vibration plate 127 when the voice coil 128 is magnetized by the given predetermined electrical signals.

Accordingly, when the magnetized coil 118 is applied with low frequency signals through a electrical line (not shown), the first magnetic generating means 119 is upwardly and downwardly vibrated by the repulsive power generated between the first magnetic generating means 119 and the magnetized coil 118. The vibration energy generated at this time is transferred to the case 120 through the plate spring 121.

Alternatively, when the voice coil 128 is applied with high frequency signals through an electrical line (not shown), the voice coil 128 and the vibration plate 127 are upwardly and downwardly vibrated by the repulsive power generated between the second magnetic generating means 129 and the voice coil 128. At this time, when the numbers of vibrations is over the audible frequency, pre-set sound is generated.

In the present invention, the device for preventing sleepiness is applied to the glasses for example, but this device may be freely applied to any goods like a hair band, a hat or cap regardless of its kinds without great modification if this device may be approached to the temple of the user.

Although the preferred embodiment of the present invention have been described, it is understood that the present invention should not be limited to this preferred embodiment but various changes and modifications can be made by one skilled in the art within the spirit and scope of the present invention aimed.

What is claimed is:
1. Glasses for preventing sleepiness to a wearer, the glasses comprising:
   a pair of temple arms for mounting the glasses on a wearer, the temple arms provided on the both sides of a glasses frame;

a stimulating body for stimulating the temple of the wearer, the stimulating body provided on the pair of temple arms;

a vibration element for providing vibration to the stimulating body;

a battery for supplying electric power to the vibration element; and a plurality of operating buttons for selectively electrically connecting the vibration element to the battery, the operating buttons providing various modes including vibration mode and sound mode, wherein the pair of temple arms have a vibration element receiving recess in which the vibration element is received, a battery receiving recess in which the battery is received, and a cover recess in which a cover for covering the vibration element and the battery is inserted, wherein the stimulating body includes a hemispherical or partially spherical shaped stimulating portion, the stimulating portion made of an elastic material, a disc shaped installing portion, and a disc shaped extending portion, and wherein the disc shaped installing portion is inserted in a through-hole formed in the cover, and the disc shaped extending portion extends toward the disc shaped installing portion and has a larger diameter than that of the through-hole such that it is not easily detached through the through-hole.

2. The glasses for preventing sleepiness according to claim 1, wherein the hemispherical or partially spherical shaped stimulating portion is outwardly exposed, and formed with a plurality of protrusions on the surface thereof in order to enhance the stimulation strength on the temple of the wearer.

3. The glasses for preventing sleepiness according to claim 1, wherein the battery is rechargeable or non-rechargeable.

4. The glasses for preventing sleepiness according to claim 1, wherein the vibration element generates sound.

5. The glasses for preventing sleepiness according to claim 1, wherein the vibration element includes a vibration generating means and a sound generating means coupled together, and each of said vibration generating means and said sound generating means having a magnet and a magnetized coil.

* * * * *